US010781988B2

(12) United States Patent
Yagi

(10) Patent No.: US 10,781,988 B2
(45) Date of Patent: Sep. 22, 2020

(54) VEHICULAR LAMP

(71) Applicant: KOITO MANUFACTURING CO., LTD., Tokyo (JP)

(72) Inventor: Takayuki Yagi, Shizuoka (JP)

(73) Assignee: KOITO MANUFACTURING CO., LTD., Minato-ku, Tokyo (JP)

(*) Notice: Subject to any disclaimer, the term of this patent is extended or adjusted under 35 U.S.C. 154(b) by 0 days.

(21) Appl. No.: 16/295,453

(22) Filed: Mar. 7, 2019

(65) Prior Publication Data

US 2019/0277469 A1 Sep. 12, 2019

(30) Foreign Application Priority Data

Mar. 8, 2018 (JP) ................................. 2018-041522

(51) Int. Cl.

| | |
|---|---|
| ***B60Q 1/00*** | (2006.01) |
| ***F21S 41/255*** | (2018.01) |
| ***F21S 41/14*** | (2018.01) |
| ***F21S 41/32*** | (2018.01) |
| ***F21S 41/29*** | (2018.01) |
| *F21Y 115/10* | (2016.01) |

(52) U.S. Cl.

CPC ............ *F21S 41/255* (2018.01); *F21S 41/14* (2018.01); *F21S 41/295* (2018.01); *F21S 41/32* (2018.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| 5,938,319 A | 8/1999 | Hege | | |
| 2014/0071706 A1* | 3/2014 | Yagi | F21S 41/285 | 362/520 |
| 2015/0191115 A1* | 7/2015 | Yamamura | F21S 41/143 | 315/82 |

FOREIGN PATENT DOCUMENTS

| | | |
|---|---|---|
| JP | 09-104288 A | 4/1997 |

* cited by examiner

*Primary Examiner* — Vip Patel

(74) *Attorney, Agent, or Firm* — Sughrue Mion, PLLC

(57) ABSTRACT

A vehicular lamp includes a two-dimensional image forming device configured to form a contrast image from light emitted by a light source; and a projection optical system configured to project the contrast image forward. The two-dimensional image forming device includes an image-forming performance decreasing portion configured to decrease image-forming performance of forming a part of the projected contrast image.

5 Claims, 8 Drawing Sheets

VEHICULAR LAMP

INCORPORATION BY REFERENCE

The disclosure of Japanese Patent Application No. 2018-041522 filed on Mar. 8, 2018 including the specification, drawings and abstract is incorporated herein by reference in its entirety.

BACKGROUND

1. Technical Field

The disclosure relates to a vehicular lamp.

2. Description of Related Art

Japanese Patent Application Publication No. 9-104288 (JP 9-104288 A) describes a vehicular illuminating device in which light emitted by a light source is reflected by a reflecting direction turning device such that the light passes through a lens to form a desired light distribution pattern. In the reflecting direction turning device, a plurality of reflective elements are arranged in a matrix. In the vehicular illuminating device, some of a large number of the arranged reflective elements are controlled such that the light emitted by the light source is partially reflected in a direction that is not directed toward the lens. Thus, the light distribution patterns in a plurality of shapes can be formed.

SUMMARY

However, in the above-described vehicular illuminating device, the light, which should be originally reflected in the direction that is not directed toward the lens, may be reflected in a direction toward the lens and radiated ahead of a vehicle, due to operation failure of some of the reflective elements. In this case, a preceding vehicle or a pedestrian ahead of a host vehicle may be affected by glare.

The disclosure provides a vehicular lamp that can reduce an influence of glare.

A vehicular lamp according to an aspect of the disclosure includes a two-dimensional image forming device configured to form a contrast image from light emitted by a light source; and a projection optical system configured to project the contrast image forward. The two-dimensional image forming device includes an image-forming performance decreasing portion configured to decrease image-forming performance of forming a part of the projected contrast image.

According to the aspect, the part of the contrast image is not distinctly (clearly) formed. Thus, even in a situation where a person is affected by glare of a bright section of the projected contrast image, an influence of the glare on the person can be reduced.

The two-dimensional image forming device may be configured to selectively transmit the light emitted by the light source, toward the projection optical system; and the image-forming performance decreasing portion may be provided at a position offset from a focus of the projection optical system. Thus, the image-forming performance of forming the part of the projected contrast image can be decreased simply by disposing the image-forming performance decreasing portion in the above-described manner.

The two-dimensional image forming device may be configured to selectively transmit the light emitted by the light source, toward the projection optical system; and the image-forming performance decreasing portion may be a scattering element provided in an intermediate portion of an optical path from the two-dimensional image forming device to the projection optical system. Thus, the image-forming performance of forming the part of the projected contrast image can be decreased without changing the manner in which the image-forming performance decreasing portion is disposed.

The two-dimensional image forming device may include a reflection region that selectively reflects the light emitted by the light source, toward the projection optical system; and the image-forming performance decreasing portion may be a scattering element provided in an intermediate portion of an optical path from the reflection region to the projection optical system. Thus, the image-forming performance of forming the part of the projected contrast image can be decreased without changing the manner in which the image-forming performance decreasing portion is disposed.

The two-dimensional image forming device may include a reflection region that selectively reflects the light emitted by the light source, toward the projection optical system; and the image-forming performance decreasing portion may be provided at a position offset from a focus of the projection optical system. Thus, the image-forming performance of forming the part of the projected contrast image can be decreased simply by disposing the image-forming performance decreasing portion in the above-described manner.

The image-forming performance decreasing portion may be disposed in an optical path of the light forming a region of the contrast image, the region being projected above a horizontal line ahead of a vehicle. Thus, it is possible to reduce the influence of the glare on a person who is present above the horizontal line ahead of the vehicle.

Any combination of components described so far, and a method, a device, a system and the like, which are provided by changing the expression of the disclosure, are also effective as aspects of the disclosure.

According to the disclosure, it is possible to realize the vehicular lamp that can reduce the influence of the glare.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1A:
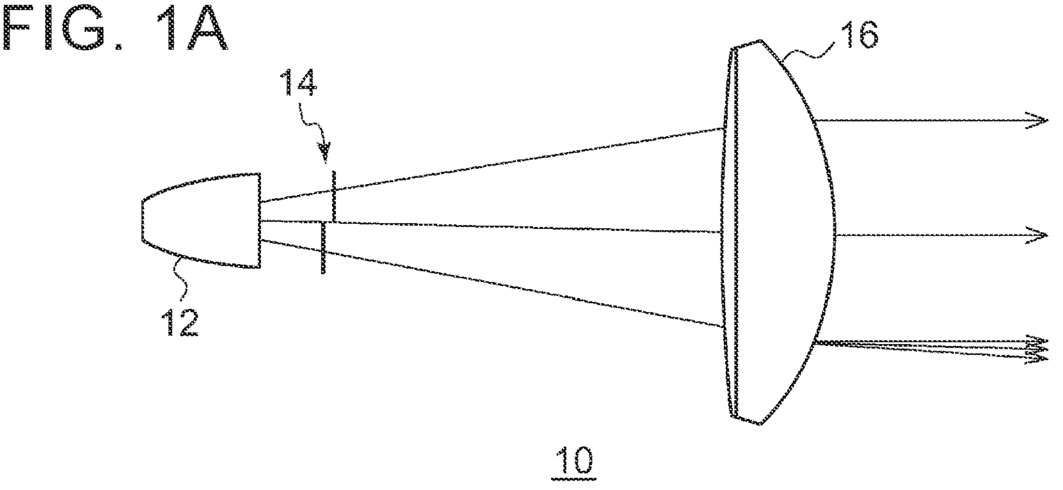
FIG. 1A is a side view that schematically shows a vehicular lamp according to a first embodiment.

A detailed description will hereinafter be provided on embodiments of the disclosure with reference to the drawings. In the description of the drawings, the same components will be denoted by the same reference numerals and symbols, and a duplicate description thereon will be appropriately omitted.

Figure 1B:
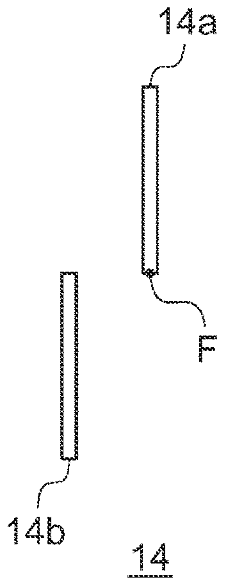
FIG. 1B is a side view that schematically shows arrangement of a two-dimensional image forming device according to the first embodiment.
Figure 1C:
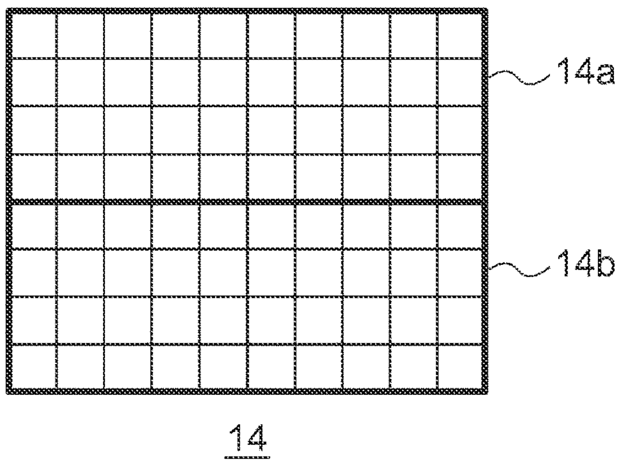
FIG. 1C is a front view of the two-dimensional image forming device according to the first embodiment.

A description will be provided on a first embodiment. FIG. 1A is a side view that schematically shows a vehicular lamp according to the first embodiment, FIG. 1B is a side view that schematically shows arrangement of a two-dimensional image forming device according to the first embodiment, and FIG. 1C is a front view of the two-dimensional image forming device according to the first embodiment.

A vehicular lamp 10 includes a light source 12; a two-dimensional image forming device 14 configured to form a contrast image (i.e., an image with bright-dark contrast) from light emitted by the light source 12 (i.e., with use of light emitted by the light source 12); and a projection lens 16 that is a projection optical system configured to project the contrast image forward.

As the light source 12, any of various devices suited for the vehicular lamp can be used. Examples of the light source 12 are devices such as a light bulb, a discharge lamp, a light-emitting diode (LED), a laser diode (LD), and a neon tube. In addition, two or more of the devices may be combined according to an application purpose or required performance. Furthermore, depending on the device, brightness thereof may be controlled by turning on and off some elements or through pulse-width modulation (PWM) control.

The two-dimensional image forming device 14 is configured to selectively transmit the light emitted by the light source 12, toward the projection lens 16. The two-dimensional image forming device 14 can control the transmissivity of the light (i.e., the rate at which the light is transmitted). For example, the two-dimensional image forming device 14 may include a liquid-crystal panel or the like in which the elements are arranged in a matrix. The two-dimensional image forming device 14 according to the first embodiment includes two separate liquid-crystal panels 14*a*, 14*b*. The liquid-crystal panel 14*a* is disposed such that a lower end thereof is located at or in the vicinity of a focus F of the projection lens 16, and the liquid-crystal panel 14*b* is disposed at a position offset from the focus, that is, a position behind (rearward of) the focus F. The two liquid-crystal panels 14*a*, 14*b* are arranged such that the elements do not overlap each other in a front view seen from the projection lens 16. The projection lens 16 projects the light, which has passed through the two-dimensional image forming device 14, ahead of the vehicle in a specified light distribution pattern. For example, the vehicular lamp 10 shown in FIG. 1A is configured to form a high beam distribution pattern.

When the two-dimensional image forming device 14 is brought to a state where some of the elements arranged in the matrix do not transmit the light, a non-radiating section (a dark section) can be formed in a part of the light distribution pattern. In this way, good visibility can be obtained in a large area ahead of the vehicle while a person (a vehicle occupant or a pedestrian) who is present in the non-radiating section is not affected by glare.

Figure 2A:
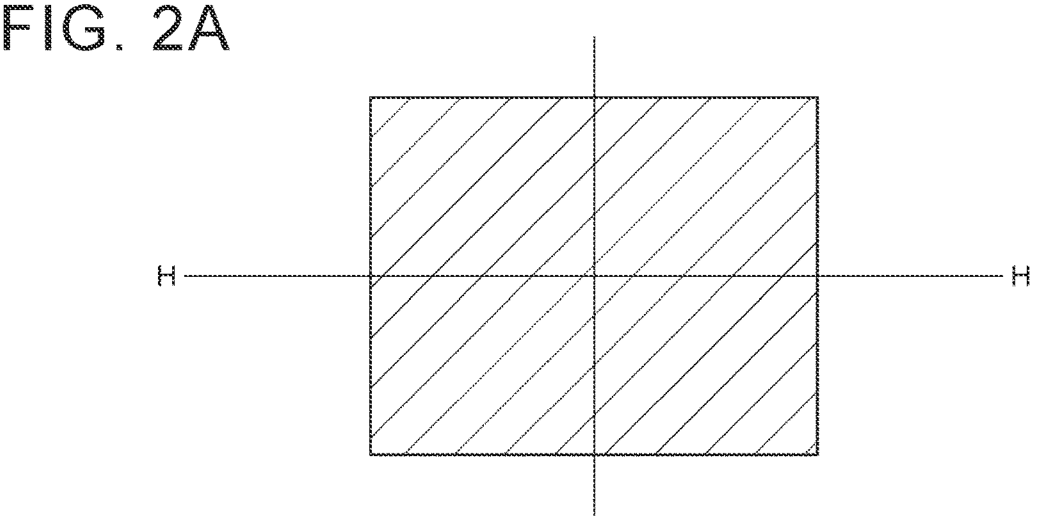
FIG. 2A is a schematic view of a high beam distribution pattern formed by the vehicular lamp according to the first embodiment.
Figure 2B:
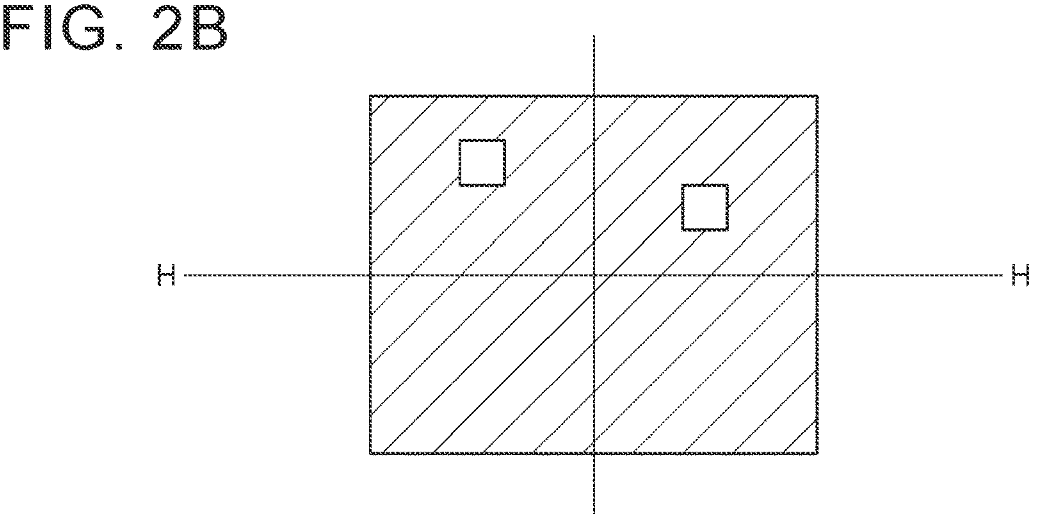
FIG. 2B is a schematic view of a partial high beam distribution pattern in which a non-radiating section is formed in a part of the high beam distribution pattern.
Figure 2C:
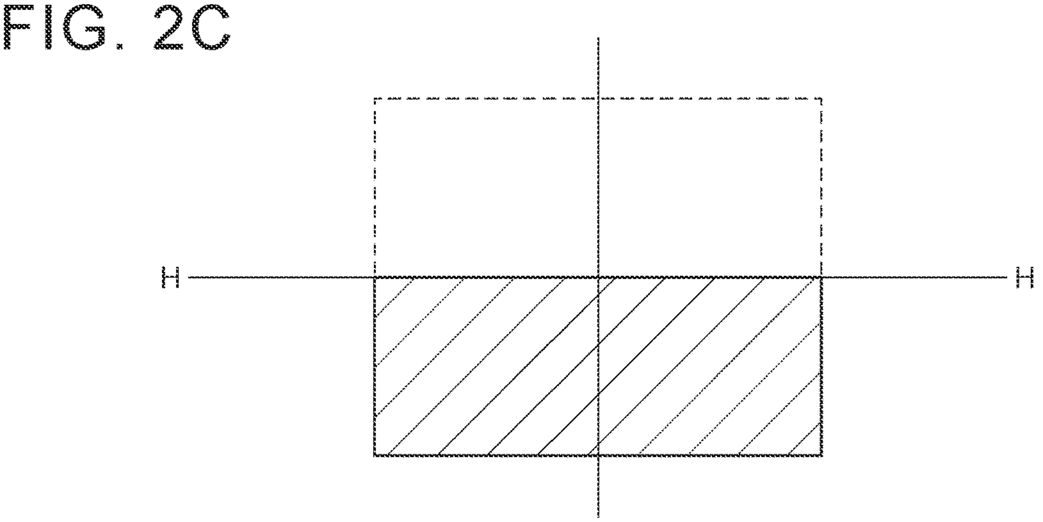
FIG. 2C is a schematic view of a low beam distribution pattern.
Figure 3A:
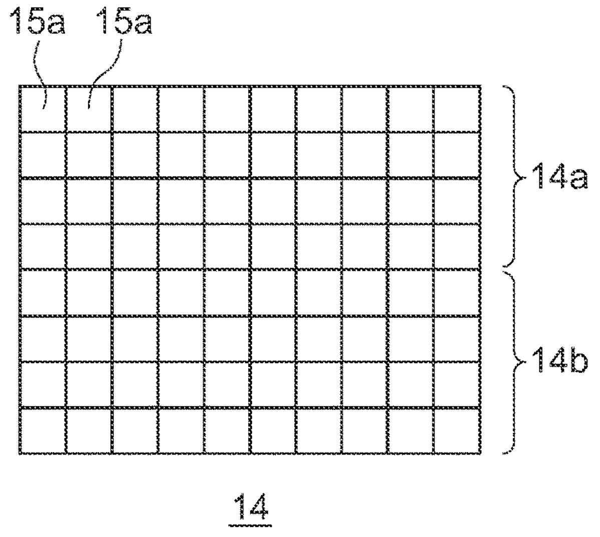
FIG. 3A is a view of a transmission state of each of liquid-crystal elements in the two-dimensional image forming device at the time of forming the high beam distribution pattern shown in FIG. 2A.
Figure 3B:
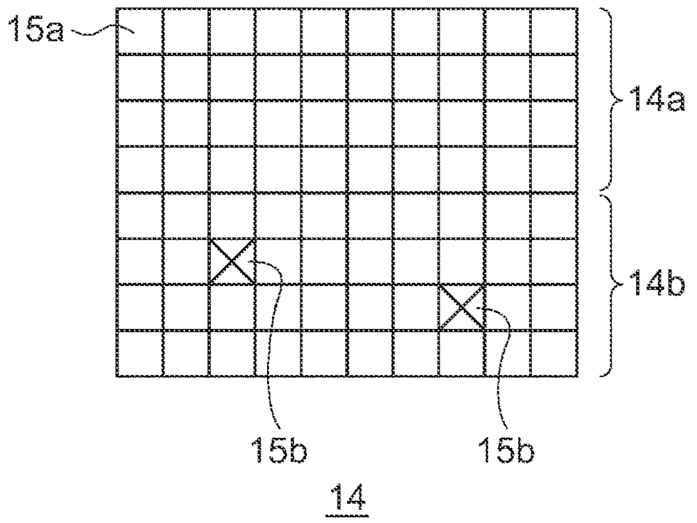
FIG. 3B is a view of a transmission state of each of the liquid-crystal elements in the two-dimensional image forming device at the time of forming the partial high beam distribution pattern shown in FIG. 2B.
Figure 3C:
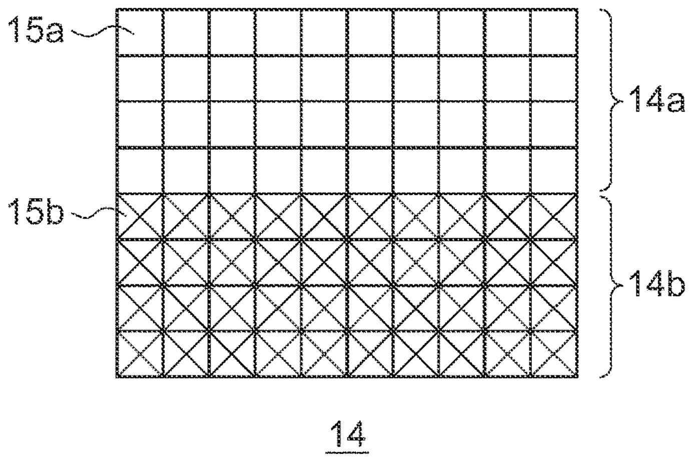
FIG. 3C is a view of a transmission state of each of the liquid-crystal elements in the two-dimensional image forming device at the time of forming the low beam distribution pattern shown in FIG. 2C.

FIG. 2A is a schematic view of the high beam distribution pattern made by the vehicular lamp 10 according to the first embodiment, FIG. 2B is a schematic view of a partial high beam distribution pattern in which the non-radiating section is formed in a part of the high beam distribution pattern, and FIG. 2C is a schematic view of a low beam distribution pattern. FIG. 3A is a view of a transmission state of each liquid-crystal element in the two-dimensional image forming device at the time of forming the high beam distribution pattern shown in FIG. 2A, FIG. 3B is a view of a transmission state of each of the liquid-crystal elements in the two-dimensional image forming device at the time of forming the partial high beam distribution pattern shown in FIG. 2B, and FIG. 3C is a view of a transmission state of each of the liquid-crystal elements in the two-dimensional image forming device at the time of forming the low beam distribution pattern shown in FIG. 2C. Each liquid-crystal element 15*a* shown in FIG. 3A to FIG. 3C is in a state of transmitting the light emitted by the light source 12. Each liquid-crystal element 15*b* shown in FIG. 3A to FIG. 3C is in a state of not transmitting the light emitted by the light source 12.

A bright section of the two-dimensional image forming device 14 shown in each of FIG. 3A to FIG. 3C is formed in the state where the liquid-crystal elements 15*a* transmit the light emitted by the light source 12. A dark section of the two-dimensional image forming device 14 shown in each of FIG. 3B and FIG. 3C is formed in the state where the liquid-crystal elements 15*b* do not transmit the light emitted by the light source 12. In addition, the image that is formed by the two-dimensional image forming device 14 shown in each of FIG. 3A to FIG. 3C is reversed by the projection lens 16 and projected ahead of the vehicle in the light distribution pattern shown in each of FIG. 2A to FIG. 2C.

As described above, in the case where the two-dimensional image forming device 14 is of a transmissive type and at least some of the liquid-crystal elements should be ideally in the state of not transmitting the light forward, the light may be transmitted through the liquid-crystal elements due to slight light leakage from the liquid-crystal elements or operation failure (light-shielding failure) of the liquid-crystal elements.

Figure 4A:
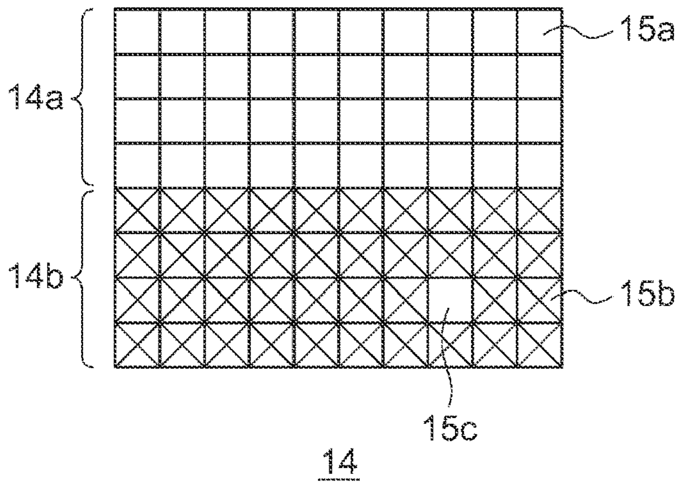
FIG. 4A is a view of a transmission state of each of the liquid-crystal elements in the case where operation failure has occurred in some of the liquid-crystal elements in the two-dimensional image forming device forming the low beam distribution pattern.
Figure 4B:
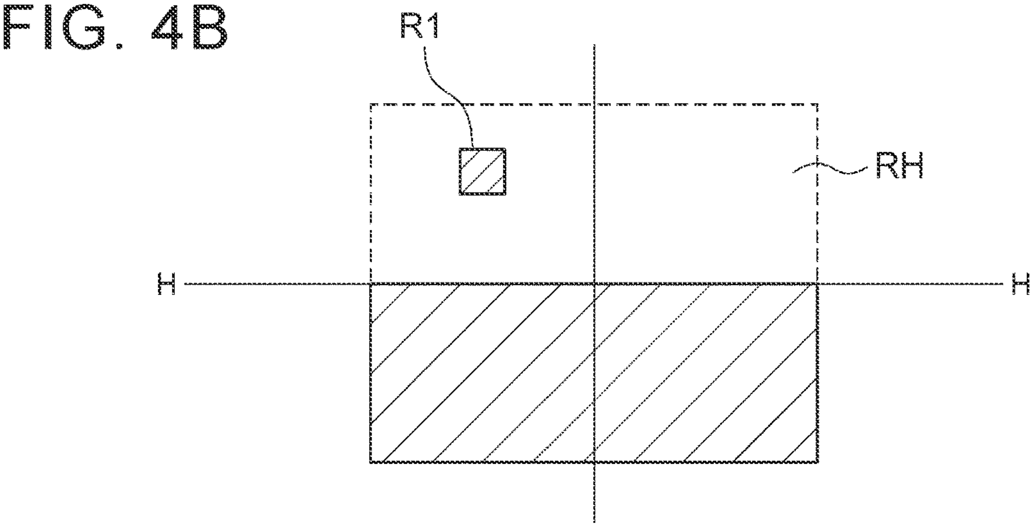
FIG. 4B is a schematic view of the low beam distribution pattern formed by the two-dimensional image forming device shown in FIG. 4A.
Figure 4C:
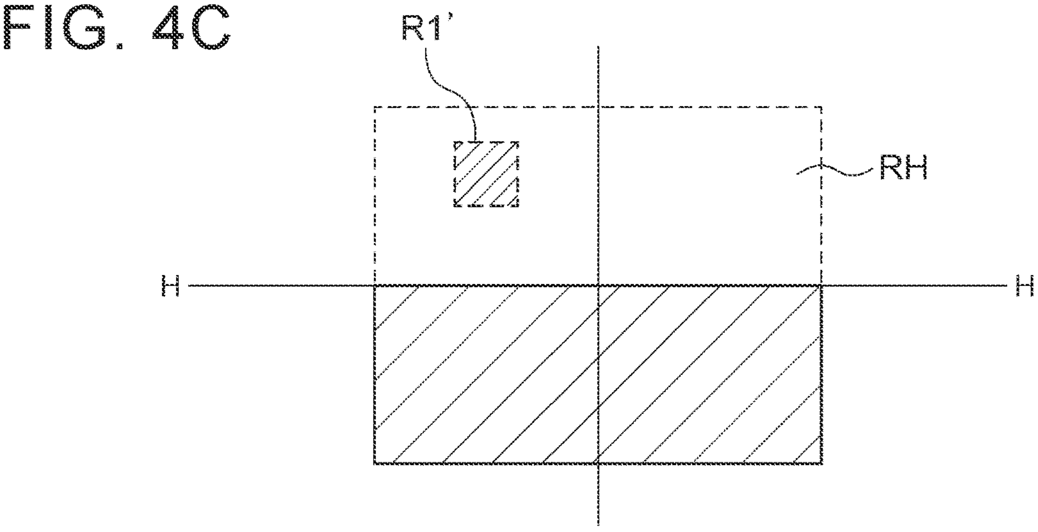
FIG. 4C is a schematic view of a state where image-forming performance of forming a part of a contrast image formed by the two-dimensional image forming device and projected by a projection lens is decreased.

FIG. 4A is a view of the transmission state of each of the liquid-crystal elements in the case where the operation failure has occurred in some of the liquid-crystal elements in the two-dimensional image forming device 14 forming the low beam distribution pattern, FIG. 4B is a schematic view of the low beam distribution pattern formed by the two-dimensional image forming device 14 shown in FIG. 4A, and FIG. 4C is a schematic view of a state where image-forming performance of forming a part of the contrast image formed by the two-dimensional image forming device 14 and projected by the projection lens 16 is decreased.

As shown in FIG. 4A, the liquid-crystal panel 14*b* of the two-dimensional image forming device 14 controls the transmission of the light mainly radiated to a region RH above a horizontal line H in the light distribution pattern. However, in the case where the liquid-crystal element, which should be originally in the state of not transmitting the light, is brought to the state of transmitting the light due to the operation failure, as shown by a liquid-crystal element 15*c* in FIG. 4A, the light is radiated to a region R1 that is a part of the region RH shown in FIG. 4B. As a result, in the case where a preceding vehicle or a pedestrian is present in the region R1, an occupant of the preceding vehicle or the pedestrian is affected by the glare.

In view of the above, the two-dimensional image forming device 14 of the vehicular lamp 10 according to the first embodiment includes an image-forming performance decreasing portion that decreases the image-forming performance of forming a part of the projected contrast image. Specifically, the image-forming performance decreasing portion is the liquid-crystal panel 14*b* that is provided at the position behind (rearward of) the focus F of the projection lens 16. The liquid-crystal panel 14*b* may be provided at a position ahead of (in front of) the focus F of the projection lens 16. In the case where the liquid-crystal panel 14*b* is offset from the focus F as described above, the part of the contrast image formed by the liquid-crystal panel 14*b* is not formed distinctly (clearly) (see a region R1' in FIG. 4C) when the contrast image (the light transmitted through the liquid-crystal element 15*c*) is projected ahead of the vehicle.

Thus, the vehicular lamp 10 can blur a contour of the contrast image in the region RH that includes the region R1' and is located above the horizontal line H, and thus can form the partial high beam distribution pattern that does not cause a driver of a host vehicle to feel a sense of discomfort. Even in a situation where a person is affected by the glare of the bright section of the projected contrast image due to the operation failure of some of the liquid-crystal elements, an influence of the glare on the person can be reduced.

The liquid-crystal panel 14*b* is disposed in an optical path of the light forming the region of the contrast image, which is projected above the horizontal line H ahead of the vehicle. Thus, it is possible to reduce the influence of the glare on a person who is present above the horizontal line H ahead of the vehicle.

As described above, the vehicular lamp 10 according to the first embodiment can decrease the image-forming performance of forming the part of the contrast image simply by disposing the liquid-crystal panel 14*b* in the above-described manner. Here, the image-forming performance can be expressed as a modulation transfer function (MTF) characteristic, resolving power, contrast, residual aberration, or the like.

Figure 5A:
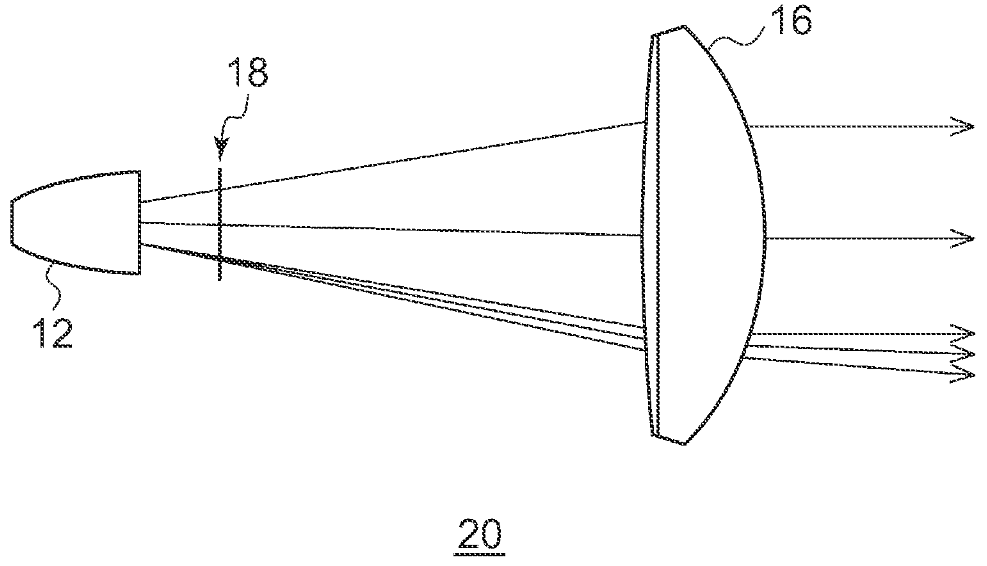
FIG. 5A is a side view that schematically shows a vehicular lamp according to a second embodiment.
Figure 5B:
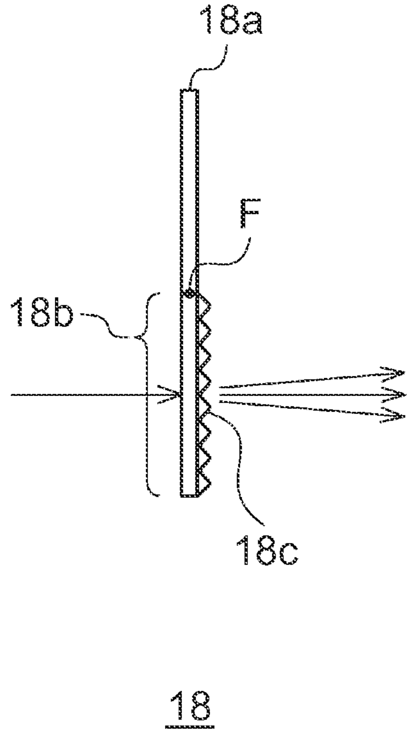
FIG. 5B is a side view that schematically shows a configuration of a two-dimensional image forming device according to the second embodiment.

A description will be provided on a second embodiment. FIG. 5A is a side view that schematically shows a vehicular lamp according to the second embodiment, and FIG. 5B is a side view that schematically shows a configuration of a two-dimensional image forming device according to the second embodiment. The same description as that of the first embodiment will be appropriately omitted.

A vehicular lamp 20 according to the second embodiment differs from the vehicular lamp 10 according to the first embodiment in a configuration of a two-dimensional image forming device 18. Specifically, the two-dimensional image forming device 18 includes a liquid-crystal panel 18*a* configured to selectively transmit the light emitted by the light source 12 toward the projection lens 16, similarly to the two-dimensional image forming device 14. A lower half of the liquid-crystal panel 18*a*, that is, a liquid-crystal panel portion 18*b* controls the transmission of the light mainly radiated to the region RH (FIG. 4B) above the horizontal line H in the light distribution pattern, and constitutes a part of the image-forming performance decreasing portion. A scattering element 18*c* configured to scatter the light is provided on a surface of the liquid-crystal panel portion 18*b*. In this way, the image-forming performance of forming the part of the projected contrast image can be decreased without changing the manner in which the liquid-crystal panel 18*a* is disposed.

The scattering element 18*c* may be provided in an intermediate portion of an optical path from the two-dimensional image forming device 18 to the projection lens 16. The scattering element 18*c* may be provided on a surface of the liquid-crystal panel 18*a*, the surface facing the light source 12. The scattering element 18*c* may be provided at a specified position that is ahead of, and away from the liquid-crystal panel 18*a*. Examples of the scattering element are a microlens, a microprism, and the like.

In the vehicular lamp 20 with the configuration, the liquid-crystal element, which should be originally in the state of not transmitting the light, may be brought to the state of transmitting the light due to the operation failure, as shown by the liquid-crystal element 15*c* in FIG. 4A. In this case, even when an occupant of a preceding vehicle or a pedestrian is present in the region R1' (see FIG. 4C), it is possible to reduce the influence of the glare on the occupant of the preceding vehicle or the pedestrian, as in the case of the vehicular lamp 10 according to the first embodiment.

Figure 6A:
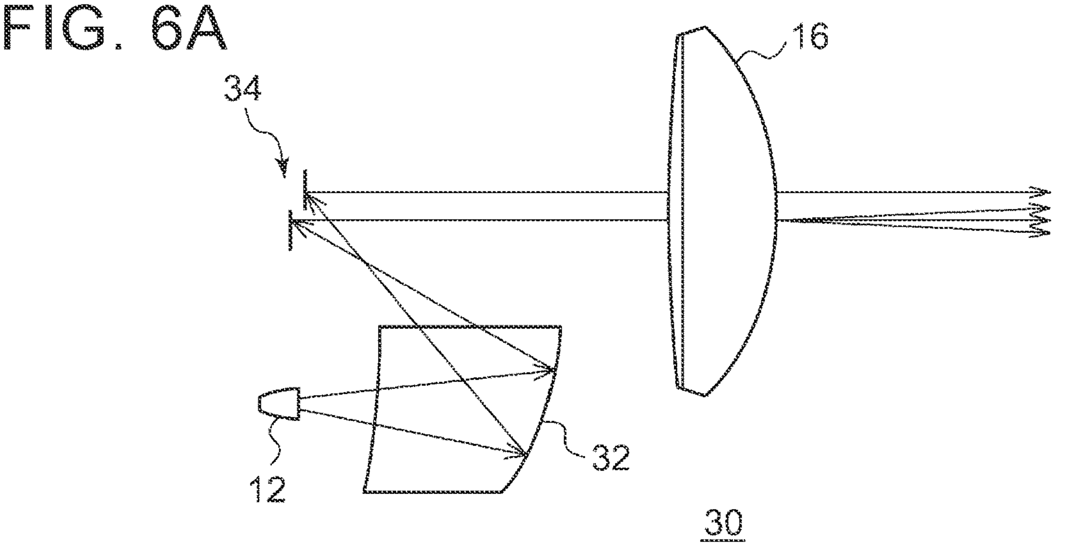
FIG. 6A is a side view that schematically shows a vehicular lamp according to a third embodiment.
Figure 6B:
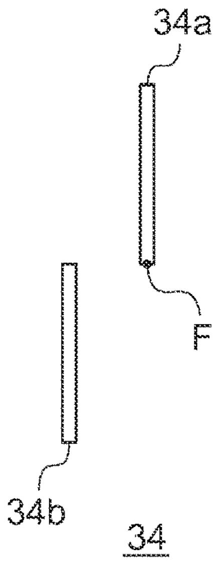
FIG. 6B is a side view that schematically shows arrangement of a two-dimensional image forming device according to the third embodiment.
Figure 6C:
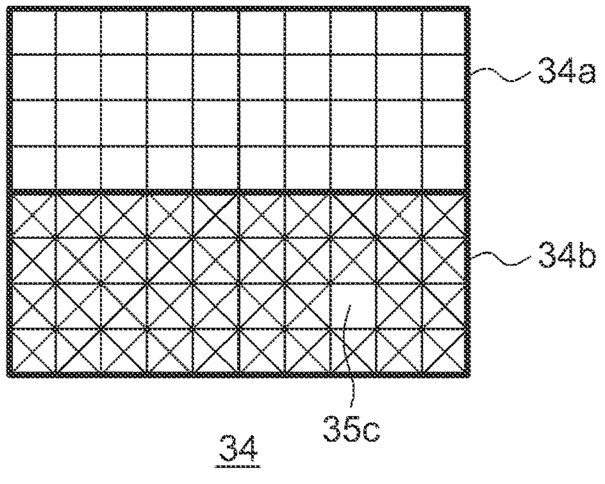
FIG. 6C is a front view of the two-dimensional image forming device according to the third embodiment.

A description will be provided on a third embodiment. FIG. 6A is a side view that schematically shows a vehicular lamp according to the third embodiment, FIG. 6B is a side view that schematically shows the arrangement of a two-dimensional image forming device according to the third embodiment, and FIG. 6C is a front view of the two-dimensional image forming device according to the third embodiment. A vehicular lamp 30 includes the light source 12; a reflector 32 configured to reflect the light emitted by the light source 12 to condense (concentrate) the light; a two-dimensional image forming device 34 configured to form the contrast image from the light reflected by the reflector 32; and the projection lens 16 configured to project the contrast image forward.

A main difference between the two-dimensional image forming device 34 according to the third embodiment and the two-dimensional image forming device 14 according to each of the first embodiment and the second embodiment is as follows. While the two-dimensional image forming device 14 according to each of the first embodiment and the second embodiment is of the transmissive type, the two-dimensional image forming device 34 according to the third embodiment is of a reflective type. However, effects of the vehicular lamp 30 are substantially the same as those of the vehicular lamp 10 and the vehicular lamp 20. Thus, a description will be provided mainly on the difference in the configuration.

The two-dimensional image forming device 34 includes a reflection region that selectively reflects the light emitted by the light source 12, toward the projection lens 16. The two-dimensional image forming device 34 can control a direction in which the light is reflected. For example, the two-dimensional image forming device 34 may include a reflective liquid-crystal panel in which liquid-crystal elements are arranged in a matrix, a microelectromechanical system (MEMS) in which micromirrors are arranged in a matrix, or the like. A transparent cover may be disposed on a reflective surface of the two-dimensional image forming device 34, so as to protect liquid crystals or the micromirrors from the external environment.

The two-dimensional image forming device 34 according to the third embodiment includes two separate MEMS panels 34*a*, 34*b*. The MEMS panel 34*a* is disposed such that a lower end thereof is located at or in the vicinity of the focus F of the projection lens 16, and the MEMS panel 34*b* is disposed at the position offset from the focus F, that is, the position behind (rearward of) the focus F. The two MEMS panels 34*a*, 34*b* are arranged such that elements do not overlap each other in the front view seen from the projection lens 16. The projection lens 16 projects the light, which has been reflected by the two-dimensional image forming device 34, ahead of the vehicle in a specified light distribution pattern. For example, the vehicular lamp 30 shown in FIG. 6A is configured to form the high beam distribution pattern.

When some of the micromirror elements arranged in the matrix are brought to a state of not reflecting the light, the non-radiating section (the dark section) can be formed in the part of the light distribution pattern. In this way, good visibility can be obtained in a large area ahead of the vehicle while a person (a vehicle occupant or a pedestrian) who is present in the non-radiating section is not affected by the glare.

Similarly to the vehicular lamp 10 according to the first embodiment, in the vehicular lamp 30 according to the third embodiment, even when at least some of the micromirror elements should be ideally in a state of not reflecting the light toward the projection lens 16, the micromirror elements may not move from reflective positions at which the light is radiated toward the projection lens 16 due to operation failure of the micromirror elements. In this case, as shown in FIG. 4B, the light is radiated to the region R1 that is the part of the region RH. As a result, in the case where a preceding vehicle or a pedestrian is present in the region R1, an occupant of the preceding vehicle or the pedestrian is affected by the glare.

In view of the above, the two-dimensional image forming device 34 according to the third embodiment includes the image-forming performance decreasing portion that decreases the image-forming performance of forming the part of the projected contrast image. Specifically, the image-forming performance decreasing portion is the MEMS panel 34*b* that is provided at the position behind the focus F of the projection lens 16. The MEMS panel 34*b* may be provided at the position ahead of the focus F of the projection lens 16. In the case where the MEMS panel 34*b* is offset from the focus F as described above, the part of the contrast image formed by the MEMS panel 34*b* is not formed distinctly (clearly) (see the region R1' in FIG. 4C) when the contrast image (the light reflected by a micromirror element 35*c*) is projected ahead of the vehicle. Thus, even in a situation where a person is affected by the glare of the bright section of the projected contrast image due to the operation failure of some of the micromirror elements, the influence of the glare on the person can be reduced.

As described above, the vehicular lamp 30 according to the third embodiment can decrease the image-forming performance of forming the part of the projected contrast image simply by disposing the MEMS panel 34*b* in the above-described manner.

Figure 7A:
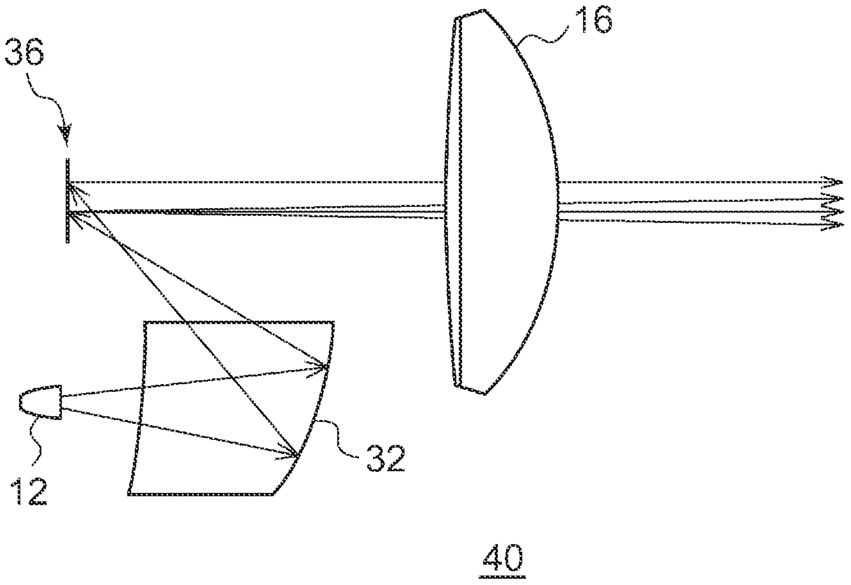
FIG. 7A is a side view that schematically shows a vehicular lamp according to a fourth embodiment.
Figure 7B:
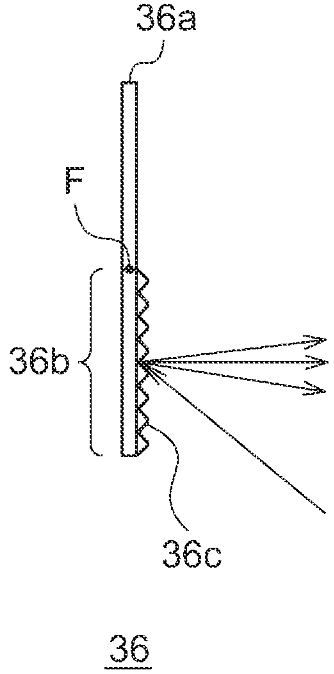
FIG. 7B is a side view that schematically shows a configuration of a two-dimensional image forming device according to the fourth embodiment.

A description will be provided on a fourth embodiment. FIG. 7A is a side view that schematically shows a vehicular lamp according to the fourth embodiment, and FIG. 7B is a side view that schematically shows a configuration of a two-dimensional image forming device according to the fourth embodiment. The same description as that of the third embodiment will be appropriately omitted.

A vehicular lamp 40 according to the fourth embodiment differs from the vehicular lamp 30 according to the third embodiment in a configuration of a two-dimensional image forming device 36. Specifically, similarly to the two-dimensional image forming device 34, the two-dimensional image forming device 36 includes a MEMS panel 36*a* configured to selectively reflect the light emitted by the light source 12 toward the projection lens 16 (i.e., the projection optical system). A lower half of the MEMS panel 36*a*, that is, a MEMS panel portion 36*b* controls a reflection state of the light mainly radiated to the region RH (FIG. 4B) above the horizontal line H in the light distribution pattern, and constitutes a part of the image-forming performance decreasing portion. A scattering element 36*c* is provided on a surface of the MEMS panel portion 36*b*. In this way, the image-forming performance of forming the part of the projected contrast image can be decreased without changing the manner in which the MEMS panel 36*a* is disposed.

The scattering element 36*c* may be provided in an intermediate portion of an optical path from the two-dimensional image forming device 36 to the projection lens 16. The scattering element 36*c* may be provided at a specified position that is ahead of, and away from the MEMS panel 36*a*. In the vehicular lamp 40 with the configuration, the micromirror element, which should be originally in a control state of not reflecting the light toward the projection lens 16, may not move from the reflective position at which the light is reflected toward the projection lens 16 due to the operation failure, as shown by the micromirror element 35*c* in FIG. 6C. In this case, even when a preceding vehicle or a pedestrian is present in the region R1' (see FIG. 4C), it is possible to reduce the influence of the glare on an occupant of the preceding vehicle or the pedestrian, as in the case of the vehicular lamp 30 according to the third embodiment.

Figure 8:
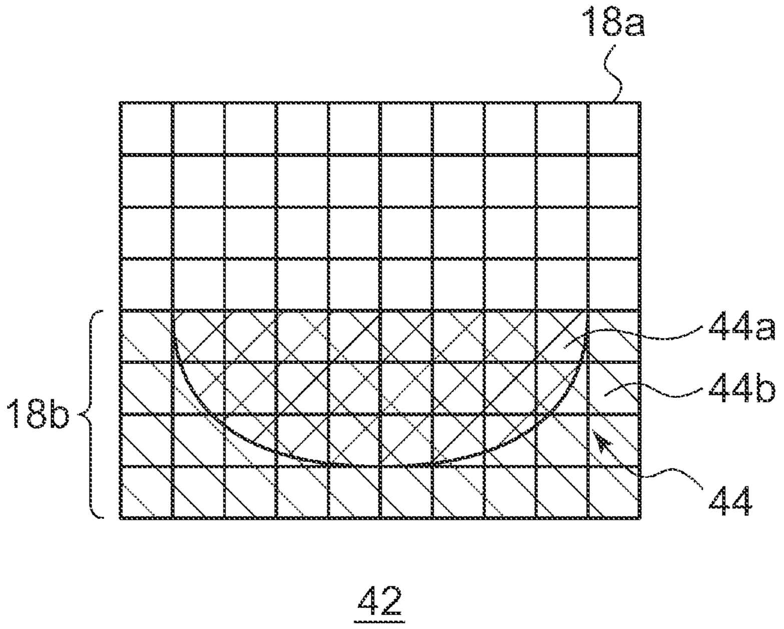
FIG. 8 is a front view that schematically shows a configuration of a two-dimensional image forming device according to a fifth embodiment.

A description will be provided on a fifth embodiment. With regard to the scattering elements provided on the surfaces of the two-dimensional image forming device 18 according to the second embodiment and the two-dimensional image forming device 36 according to the fourth embodiment, a degree of scattering is uniform in an entire lower half of each of the two-dimensional image forming devices. In contrast, in a two-dimensional image forming device according to the fifth embodiment, the degree of scattering caused by a scattering element provided on a surface thereof differs according to the position. FIG. 8 is a front view that schematically shows a configuration of the two-dimensional image forming device according to the fifth embodiment.

In a two-dimensional image forming device 42 shown in FIG. 8, a scattering element 44 is provided on a surface of a lower half of the transmissive liquid-crystal panel 18*a*. The scattering element 44 includes a high scattering section 44*a* having a relatively high scattering degree, and a low scattering section 44*b* having a relatively low scattering degree. The high scattering section 44*a* is provided in an upper central region of the liquid-crystal panel portion 18*b* that controls the transmission of the light radiated to the region RH (FIG. 4B) above the horizontal line H. The low scattering section 44*b* is provided around the high scattering section 44*a*. A difference in the scattering degree indicates a difference in light expansion due to presence or absence of the scattering element. In this way, it is possible to further decrease the image-forming performance of forming a central section where intensity of the light is particularly high in the high beam distribution pattern. Thus, it is possible to further reduce the influence of the glare on a person who is present at the central section.

Each of the vehicular lamps including the two-dimensional image forming devices as described above is particularly suited for a fog lamp or a low-beam headlamp. In addition, each of the above-described vehicular lamps has the configuration that is suited when adaptive driving beam (ADB) including a MEMS mirror array is used for the low-beam lamp or the fog lamp, for example.

The vehicular lamp according to each of the above-described embodiments includes a sensor that detects a traffic user such as a preceding vehicle and a pedestrian. Thus, the vehicular lamp forms the appropriate light distribution pattern based on ADB control and thus can secure good visibility ahead of the vehicle while reducing, as much as possible, the possibility that the traffic user is affected by the glare.

The description has been provided so far on the disclosure with reference to each of the above-described embodiments. The disclosure is not limited to the above-described embodiments and includes various modes in which the configurations of two or more of the embodiments are appropriately combined, and/or the configuration(s) of the embodiment(s) is/are appropriately replaced. It is possible to appropriately change the combination of components or a processing order in each embodiment, or to make various design changes in each embodiment, on the basis of knowledge of a person skilled in the art. Embodiments to which such modifications are added can be also included in the scope of the disclosure.

What is claimed is:

1. A vehicular lamp comprising:

a two-dimensional image forming device configured to form a contrast image from light emitted by a light source; and a projection optical system configured to project the contrast image forward, wherein the two-dimensional image forming device includes an image-forming performance decreasing portion configured to decrease image-forming performance of forming a part of the projected contrast image, and the image-forming performance decreasing portion is disposed in an optical path of the light forming a region of the contrast image, the region being projected only above a horizontal line ahead of a vehicle.

2. The vehicular lamp according to claim 1 wherein:

the two-dimensional image forming device is configured to selectively transmit the light emitted by the light source, toward the projection optical system; and the image-forming performance decreasing portion is provided at a position offset from a focus of the projection optical system.

3. The vehicular lamp according to claim 1 wherein:

the two-dimensional image forming device is configured to selectively transmit the light emitted by the light source, toward the projection optical system; and the image-forming performance decreasing portion is a scattering element provided in an intermediate portion of an optical path from the two-dimensional image forming device to the projection optical system.

4. The vehicular lamp according to claim 1 wherein:

the two-dimensional image forming device includes a reflection region that selectively reflects the light emitted by the light source, toward the projection optical system; and the image-forming performance decreasing portion is a scattering element provided in an intermediate portion of an optical path from the reflection region to the projection optical system.

5. The vehicular lamp according to claim 1 wherein:

the two-dimensional image forming device includes a reflection region that selectively reflects the light emitted by the light source, toward the projection optical system; and the image-forming performance decreasing portion is provided at a position offset from a focus of the projection optical system.

* * * * *